United States Patent
Eo et al.

(10) Patent No.: US 10,641,358 B2
(45) Date of Patent: May 5, 2020

(54) AUTOMATED MANUAL TRANSMISSION

(71) Applicants: Hyundai Motor Company, Seoul (KR); Kia Motors Corporation, Seoul (KR)

(72) Inventors: Soon Ki Eo, Ansan-si (KR); Kun Sa Ryu, Hwaseong-si (KR); Hong Suk Suh, Hanam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 15/916,591

(22) Filed: Mar. 9, 2018

(65) Prior Publication Data
US 2019/0162272 A1 May 30, 2019

(30) Foreign Application Priority Data
Nov. 24, 2017 (KR) .......................... 10-2017-0158941

(51) Int. Cl.
*F16H 3/089* (2006.01)
*F16H 3/10* (2006.01)
*F16H 3/00* (2006.01)
*F16H 3/08* (2006.01)

(52) U.S. Cl.
CPC ............ *F16H 3/089* (2013.01); *F16H 3/006* (2013.01); *F16H 3/10* (2013.01); *F16H 2003/0826* (2013.01); *F16H 2200/0056* (2013.01); *F16H 2200/0082* (2013.01)

(58) Field of Classification Search
CPC . F16H 3/006; F16H 3/089; F16H 3/10; F16H 2003/0826; F16H 2200/0056; F16H 2200/0082; B60W 10/02; B60W 10/111; B60W 20/40; B60K 6/383; B60K 6/48; B60K 6/547
See application file for complete search history.

(56) References Cited

U.S. PATENT DOCUMENTS

| | | | |
|---|---|---|---|
| 2011/0198139 A1* | 8/2011 | Fuechtner | B60K 6/48 180/65.25 |
| 2017/0182996 A1* | 6/2017 | Hose | B60K 6/48 |
| 2019/0263247 A1* | 8/2019 | Hummel | B60K 6/36 |

FOREIGN PATENT DOCUMENTS

KR    10-2013-0115618 A    10/2013

* cited by examiner

*Primary Examiner* — Jacob S. Scott
*Assistant Examiner* — Lori Wu
(74) *Attorney, Agent, or Firm* — Morgan, Lewis & Bockius LLP (57) ABSTRACT

An automated manual transmission may include an input shaft selectively provided with torque from an engine through a clutch; an output shaft disposed in parallel with the input shaft; a shifting device including a plurality of gear pairs, which have different gear ratios and are engaged with each other on the input shaft and the output shaft, and selecting at least a gear pair out of the plurality of gear pairs, by using a coupling member; wherein the at least a gear pair corresponds to a speed of a vehicle a motor shaft connected to a motor and provided with torque from the motor; and clutch devices disposed between the motor shaft and the input shaft to transmit torque in a first direction thereof and between the motor shaft and the output shaft to transmit torque in a second direction thereof.

4 Claims, 12 Drawing Sheets

| GEAR STAGE | C | S12 | | | S34 | | | S5(R) | | | MOTOR | |
|---|---|---|---|---|---|---|---|---|---|---|---|---|
| | | 1 | N | 2 | 3 | N | 4 | 5 | N | (R) | OWC1 | OWC2 |
| 1st | O | O | X | X | X | O | X | X | O | (X) | X | O |
| 2nd | O | X | X | O | X | O | X | X | O | (X) | X | O |
| 3rd | O | X | O | X | O | X | X | X | O | (X) | X | O |
| 4th | O | X | O | X | X | X | O | X | O | (X) | X | O |
| 5th | O | X | O | X | X | O | X | O | X | (X) | X | O |
| (Reverse) | O | X | O | X | X | O | X | X | X | (O) | X | O |

AUTOMATED MANUAL TRANSMISSION

CROSS REFERENCE TO RELATED APPLICATION

The present application claims priority to Korean Patent Application No. 10-2017-0158941, filed Nov. 24, 2017, the entire contents of which is incorporated herein for all purposes by this reference.

BACKGROUND OF THE INVENTION

Field of the Invention

The present invention relates to an automated manual transmission that removes feeling of disconnection during shifting using a motor even without adding a specific shifting mechanism or an actuator.

Description of Related Art

In an automated manual transmission, shifting is automatically performed by an actuator while a vehicle is driven, so that the automated manual transmission can provide convenience in driving, similar to an automatic transmission, and contribute to improving fuel efficiency of a vehicle due to excellent power transmission efficiency in comparison to an automatic transmission.

The automated manual transmission is a device in which shifting is performed not by a driver controlling gears, but by a Transmission Control Unit (TCU) adding a hydraulic and pneumatic actuator to a conventional manual transmission.

Meanwhile, a hybrid automated manual transmission (AMT) vehicle additionally provided with a motor between an engine and a transmission has an effective configuration that can use all gears of the transmission to transmit power from the motor to wheels.

However, when a motor is added in the present configuration, it is impossible to remove feeling of disconnection during shifting which is generated during change gears.

Accordingly, there is a demand for a method that can provide assist torque during shifting by directly connecting a motor to a transmission and remove feeling of disconnection during shifting even without adding a specific shifting mechanism or an actuator for torque assist.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automated manual transmission that can remove feeling of disconnection during shifting by connecting a motor even without adding a specific shifting mechanism or an actuator.

In various aspects of the present invention, an automated manual transmission may include: an input shaft selectively provided with torque from an engine through a clutch; an output shaft disposed in parallel with the input shaft; a shifting device including a plurality of gear pairs, which have different gear ratios and are engaged with each other on the input shaft and the output shaft, and selecting gear pairs corresponding to speed of a vehicle using a coupling member; a motor shaft provided with torque from a motor; and clutch devices disposed between the motor shaft and the input shaft to transmit torque only in a first direction and between the motor shaft and the output shaft to transmit torque only in a second direction thereof.

The clutch devices may include: a first one-way clutch disposed on a power transmission path between the motor shaft and the input shaft; and a second one-way clutch disposed on a power transmission path between the motor shaft and the output shaft.

A first power transmission gear may be disposed on the motor shaft and engaged with one of the gear pairs of the shifting device, and a second power transmission gear may be disposed on the motor shaft and is engaged with one of the other gear pairs except for the gear pair engaged with the first power transmission gear.

The first power transmission gear may be circumscriptively engaged with a gear always rotating with the input shaft, and the second power transmission gear may be circumscriptively engaged with a gear always rotating with the output shaft.

The first power transmission gear may be circumscriptively engaged with a gear fixed on the input shaft, and the second power transmission gear may be circumscriptively engaged with a gear fixed on the output shaft.

The first one-way clutch may be disposed between the motor shaft and the first power transmission gear, and the second one-way clutch may be disposed between the motor shaft and the second power transmission gear.

The clutch devices may include: a first two-way clutch disposed on a power transmission path between the motor shaft and the input shaft; and a second two-way clutch disposed on a power transmission path between the motor shaft and the output shaft.

According to an exemplary embodiment of the present invention, since the motor is connected to the output shaft through a clutch transmitting torque only in one rotational direction thereof, torque assist is achieved by the motor during shifting even without using a specific shifting mechanism or actuator, so it is possible to remove feeling of disconnection during shifting at all gear stages.

Furthermore, since the motor is connected to the input shaft through a clutch transmitting torque only in another rotational direction thereof, it is possible to start an engine using the motor and generate power using torque reversely input to the motor.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present invention are described hereafter more specifically with reference to the accompanying drawings.

An automated manual transmission of the present invention may include an input shaft IP, and output shaft OP, a shifting device, a motor shaft MGS, and clutch devices.

Figure 1:
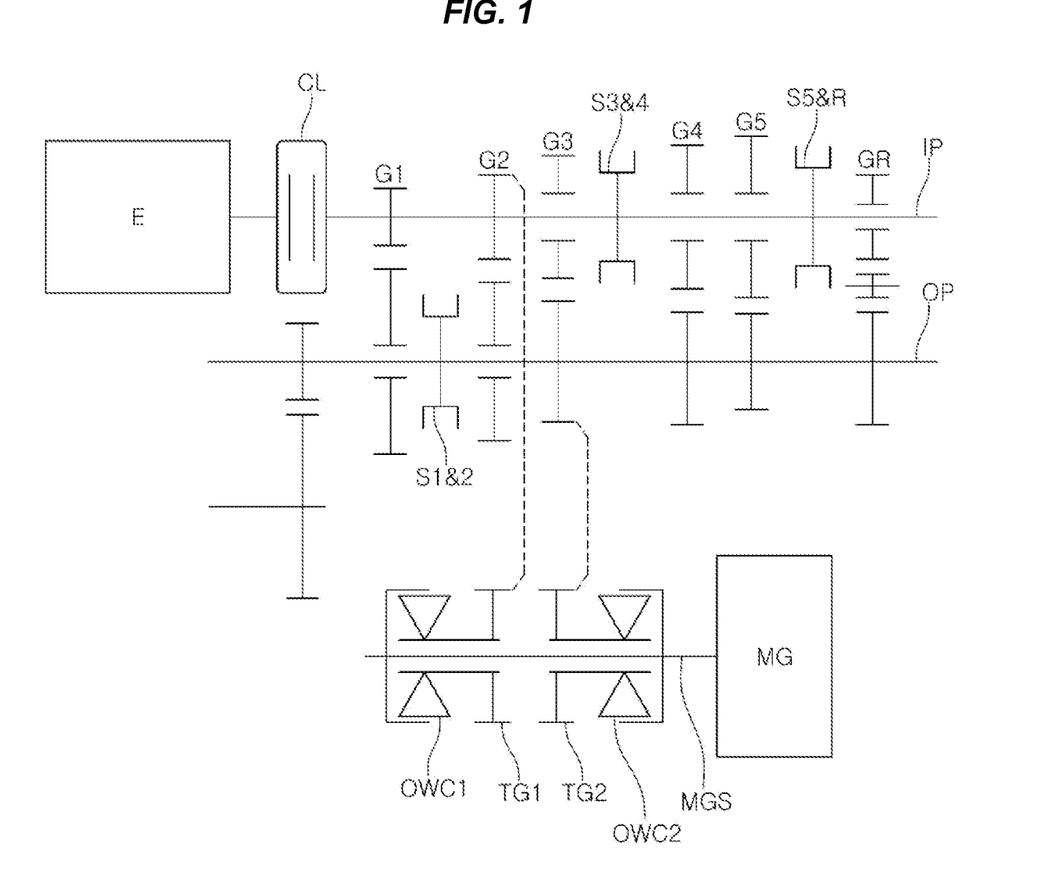
FIG. 1 is a diagram showing the configuration of various exemplary embodiments of an automated manual transmission according to an exemplary embodiment of the present invention.

Referring to FIG. 1 to describe the present invention more specifically, the input shaft IP is connected to an engine E through a clutch CL and can be rotated by selectively receiving torque from the engine E.

The output shaft OP may be disposed in parallel with the input shaft IP.

The shifting device may include a plurality of gear pairs having different gear ratios and engaged with each other on the input shaft IP and the output shaft OP, such that gear pairs corresponding to the speed of a vehicle may be selected using a coupling member.

For example, as shown in FIG. 1, the shifting device may include first to fifth gear pairs G1~G5 and an R-gear pair GR. A 1&2 coupling member S1&2 may be disposed between a first driven gear and a second driven gear to be able to select the first gear pair G1 and the second gear part G2, a 3&4 coupling member may be disposed between a third driven gear and a fourth driven gear, and a 5&R coupling member S5&R may be disposed between a fifth driven gear and an R-driven gear. At the R-gear stage, a reverse idler gear may be further disposed to change the rotational direction between the R-driving gear and R-driven gear.

The coupling members may be synchromesh type synchronizers.

Obviously, the gear pairs and coupling members are not limited the structure described above and may be changed in various structures.

A motor MG is directly connected to an end portion of the motor shaft MGS, so that the motor shaft MGS may be rotated by torque from the motor MG.

The clutch devices may be disposed between the motor shaft MGS and the input shaft IP to transmit torque only in a first direction and between the motor shaft MGS and the output shaft OP to transmit torque only in a second direction thereof.

The clutch devices may include a first one-way clutch OWC1 and a second one-way clutch OWC2. The first one-way clutch OWC1 may be disposed on the power transmission path between the motor shaft MGS and the input shaft IP and the second one-way clutch OWC2 may be disposed on the power transmission path between the motor shaft MGS and the output shaft OP.

For example, when the first one-way clutch OWC1 is not restriction-rotated counterclockwise and is relatively rotated clockwise, the second one-way clutch OWC2 is, in contrast to the first one-way clutch OWC1, relatively rotated counterclockwise and is restriction-rotated clockwise.

According to the present configuration of the present invention, when the motor MG is rotated clockwise in a process of changing gears in a vehicle, the torque from the motor MG is transmitted to the output shaft OP through the second one-way clutch OWC2, so it is possible to remove feeling of disconnection during shifting by the torque from the motor MG even without a specific shifting mechanism or actuator.

Furthermore, the clutch devices may include, instead of the one-way clutches, two-way clutches that can select restriction-rotational direction thereof.

Figure 6:
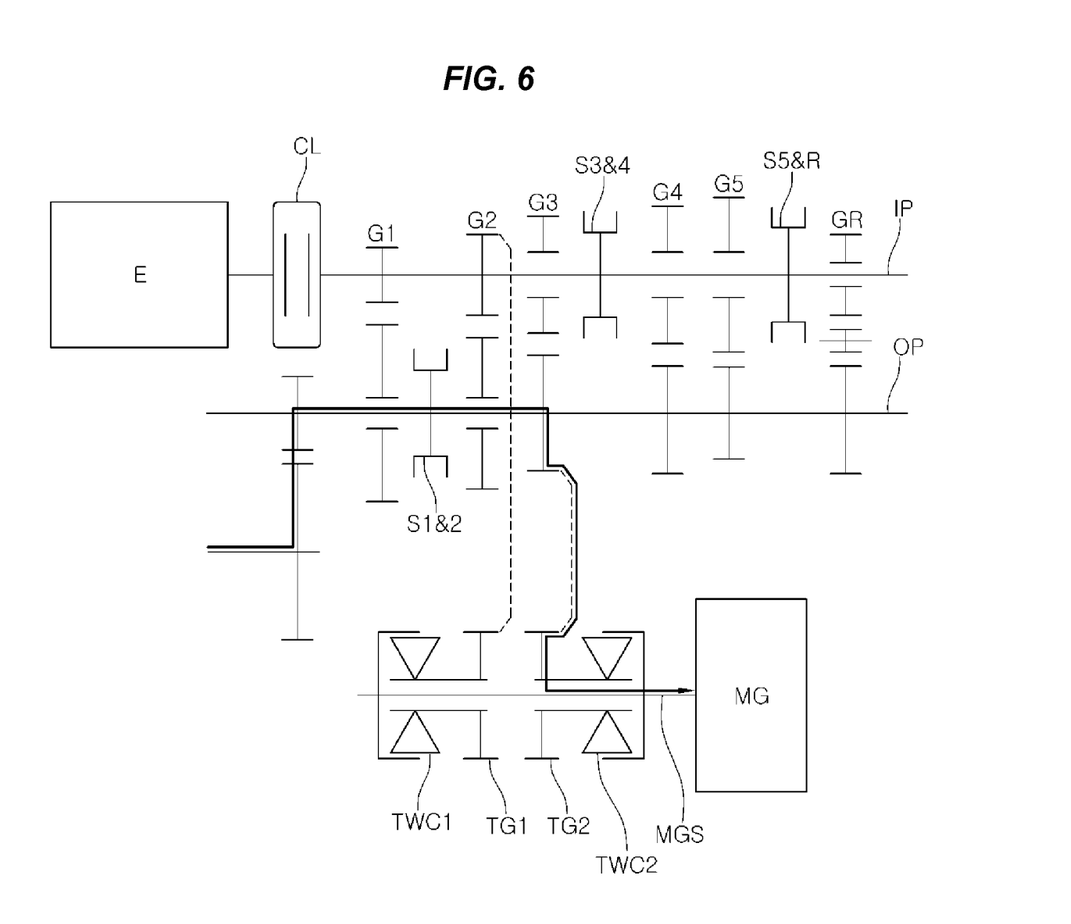
FIG. 6 is a diagram showing a power transmission path in regenerative braking in an exemplary embodiment of the present invention.

More specifically, the clutch devices may include a first two-way clutch TWC1 disposed on the power transmission path between the motor shaft MGS and the input shaft IP and a second two-way clutch TWC2 disposed on the power transmission path between the motor shaft MGS and the output shaft OP.

In the instant case, a direction control motor that changes the restriction-rotational directions of the first two-way clutch TWC1 and the second two-way clutch TWC2 may be further provided.

Furthermore, other than the one-way clutches and two-way clutches, electromagnetic clutches, synchronizers, latches, and dog clutches may be used to achieve the function of the present invention.

The structures for transmitting power between the motor shaft MGS and the input shaft IP and between the motor shaft MGS and the output shaft are described hereafter. A first power transmission gear TG1 is disposed on the motor shaft MGS 1 to be able to relatively rotate and is circumscriptively engaged with one of the gear pairs of the shifting device. The first one-way clutch OWC1 is disposed between the motor shaft MGS and the first power transmission gear TG1.

Furthermore, a second power transmission gear TG2 is disposed on the motor shaft MGS to be able to relatively rotate and is circumscriptively engaged with one of the other gear pairs except the gear pair engaged with the first power transmission gear TG1. The second one-way clutch OWC2 is disposed between the motor shaft MGS and the second power transmission gear TG2.

For example, when the first power transmission gear TG1 is engaged with the gears of the second gear pair G2, the second power transmission gear TG2 may be engaged with the gears of the third gear pair G3.

The first power transmission gear TG1 may be circumscriptively engaged with a gear always rotating with the input shaft IP and the second power transmission gear TG2 may be circumscriptively engaged with a gear always rotating with the output shaft OP.

More specifically, the first power transmission gear TG1 may be circumscriptively engaged with a gear fixed to the input shaft IP and the second power transmission gear TG2 may be circumscriptively engaged with a gear fixed to the output shaft OP.

For example, as shown in FIG. 1, the second driving gear is fixed and restriction-rotated on the input shaft IP and the first power transmission gear TG1 is circumscriptively engaged with the second driving gear, and the third driven gear is fixed and restriction-rotated on the output shaft OP and the second power transmission gear TG2 may be circumscriptively engaged with the third driven gear.

Figure 7:
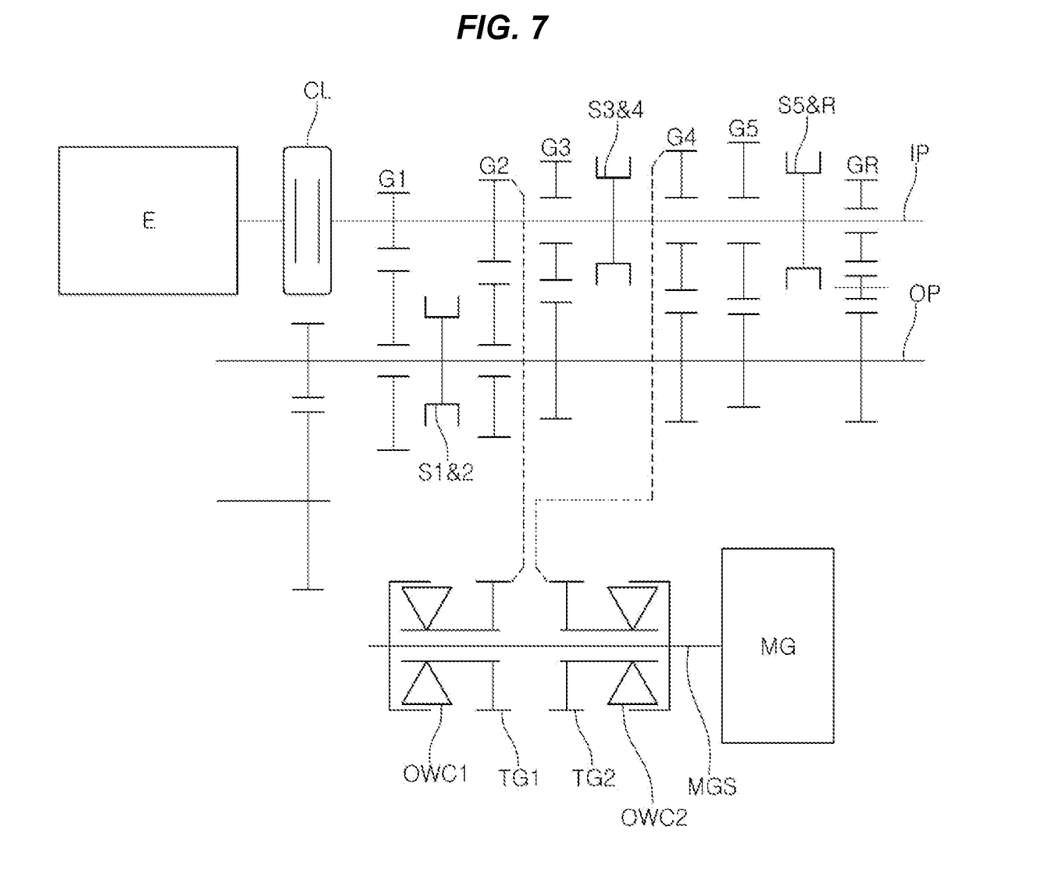
FIG. 7, FIG. 8 and FIG. 9 are diagrams showing the configurations of second to various exemplary embodiments having different engagement structure of power transmission gears according to an exemplary embodiment of the present invention.
Figure 8:
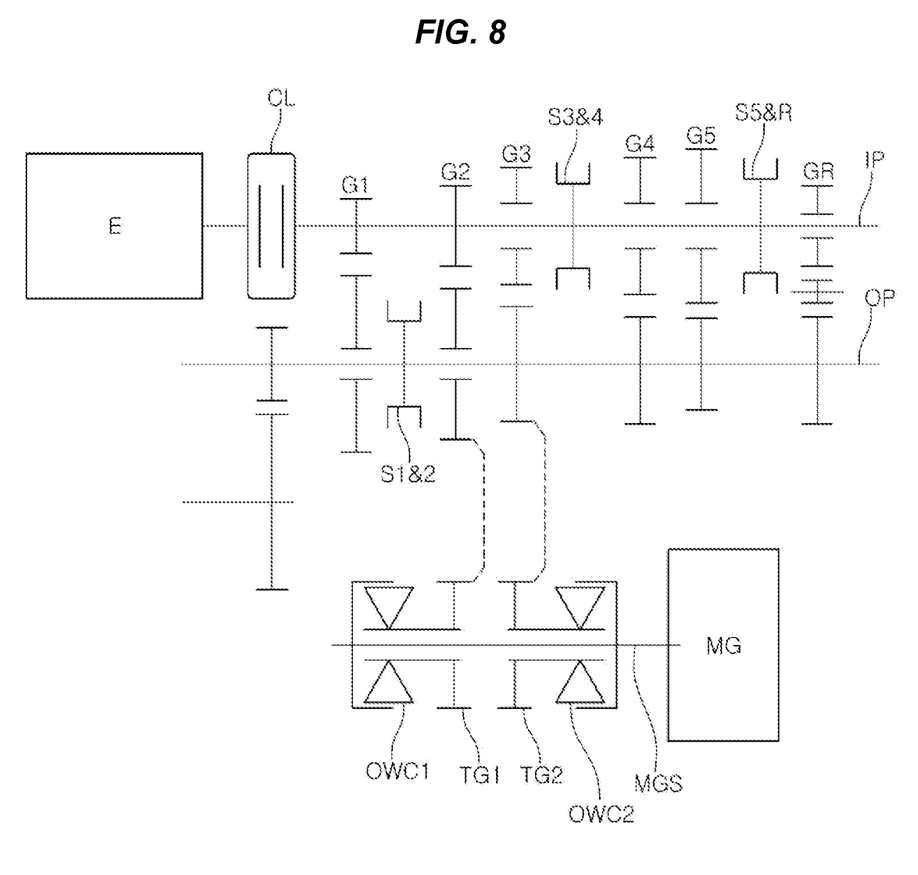
Figure 9:
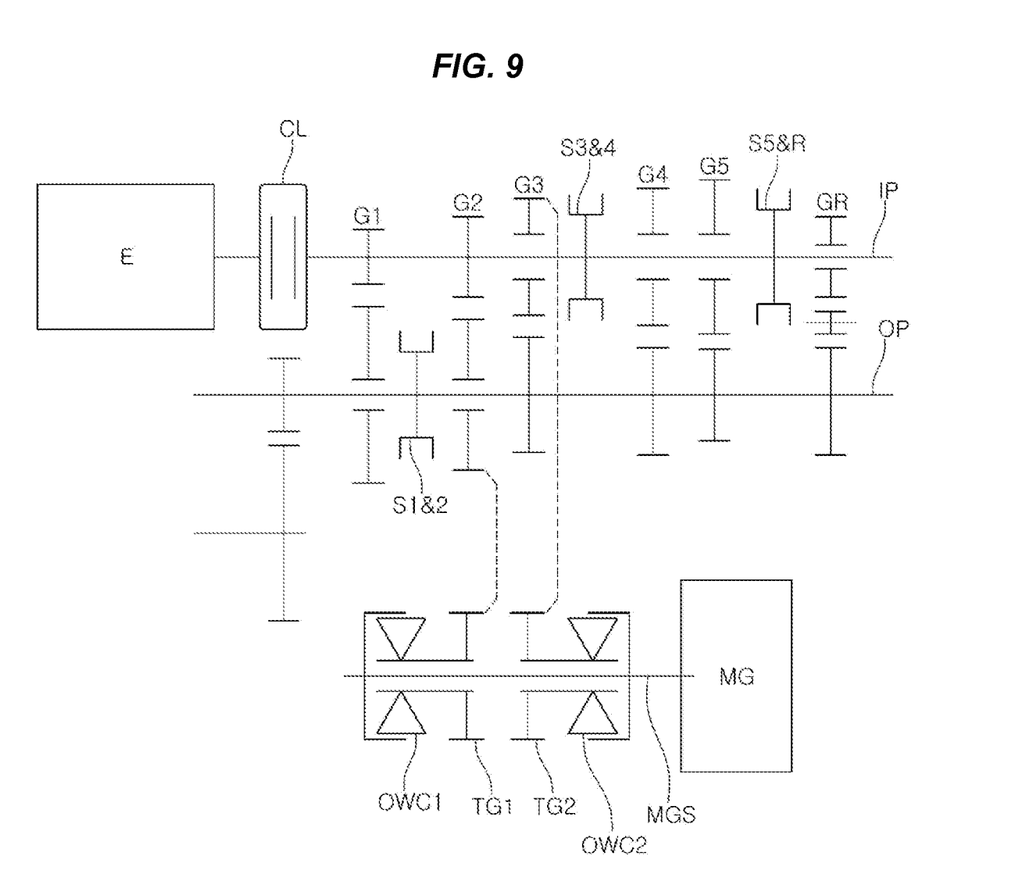

Obviously, as shown in FIGS. 7 to 9, the gears which are engaged with the first and second power transmission gears may be changed.

That is, as in the various exemplary embodiments of FIG. 7, the first power transmission gear TG1 may be engaged with the second driving gear and the second power transmission gear TG2 may be engaged with the fourth driving gear, in which the fourth driving gear is disposed on the input shaft IP, but is engaged with the fourth driven gear fixed on the output shaft OP, so that the second power transmission gear TG2 can be engaged with the gear always rotating with the output gear OP.

Furthermore, as in the various exemplary embodiments of FIG. 8, the first power transmission gear TG1 may be engaged with the second driven gear and the second power transmission gear TG2 may be engaged with the third driven gear, in which the second driven gear is disposed on the output shaft OP, but is engaged with the second driving gear fixed on the input shaft IP, so that the first power transmission gear TG1 can be engaged with the gear always rotating with the input shaft IP.

Furthermore, as in the various exemplary embodiments of FIG. 9, the first power transmission gear TG1 may be engaged with the second driving gear and the second power transmission gear TG2 may be engaged with the third driving gear, in which the second driven gear is engaged with the second driving gear fixed on the input shaft IP and the third driving gear is engaged with the third driven gear fixed on the output shaft OP, so that the first power transmission gear TG1 and the second power transmission gear TG2 can be respectively engaged with the gear always rotating with the input shaft IP and the gear always rotating with the output shaft OP.

Flow of power in a process of shifting into second gear stage from a first gear stage is described hereafter with reference to FIG. 2A, FIG. 2B, FIG. 2C, and FIG. 2D.

Figure 2A:
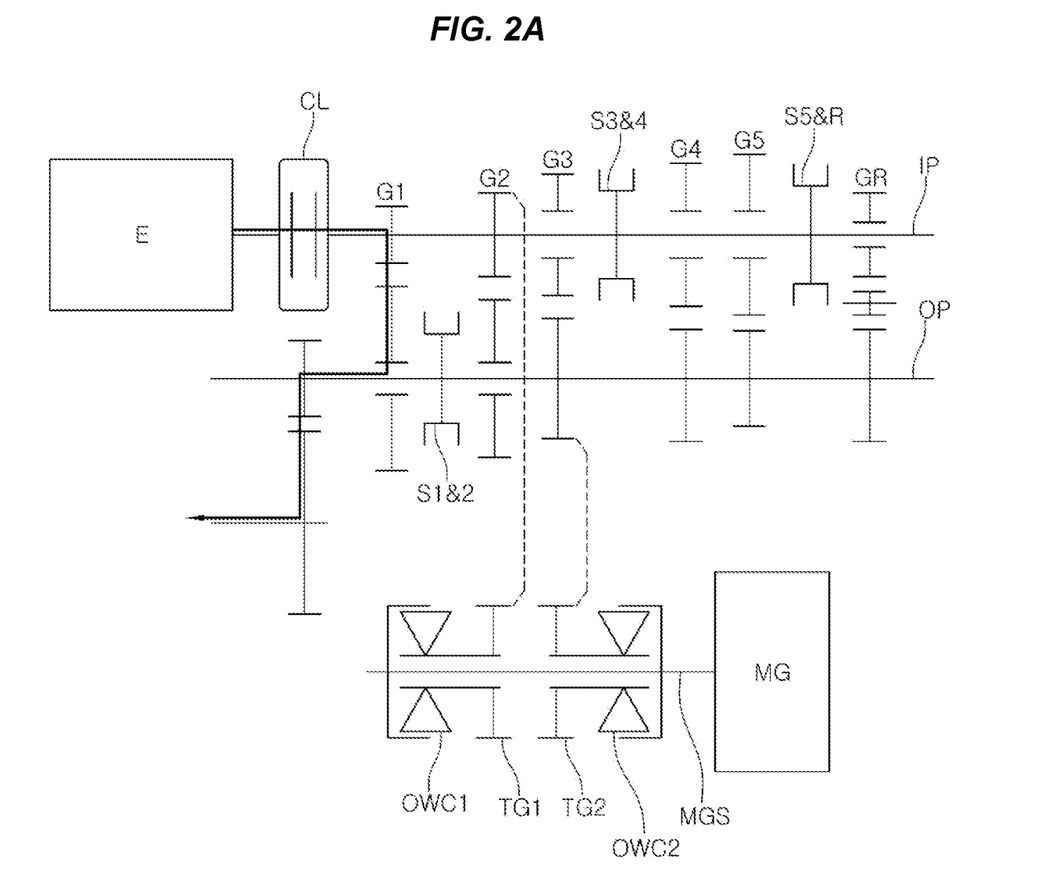
FIG. 2A, FIG. 2B, FIG. 2C, and FIG. 2D are diagrams showing a process of shifting into a second gear stage from a first gear stage and a power transmission path in the transmission of FIG. 1.

First, in FIG. 2A, the first gear pair G1 is selected by a coupling member and torque from the engine E is provided to the output shaft OP through the first gear pair G1 with the clutch CL engaged, driving a vehicle at the first gear stage.

Figure 2B:
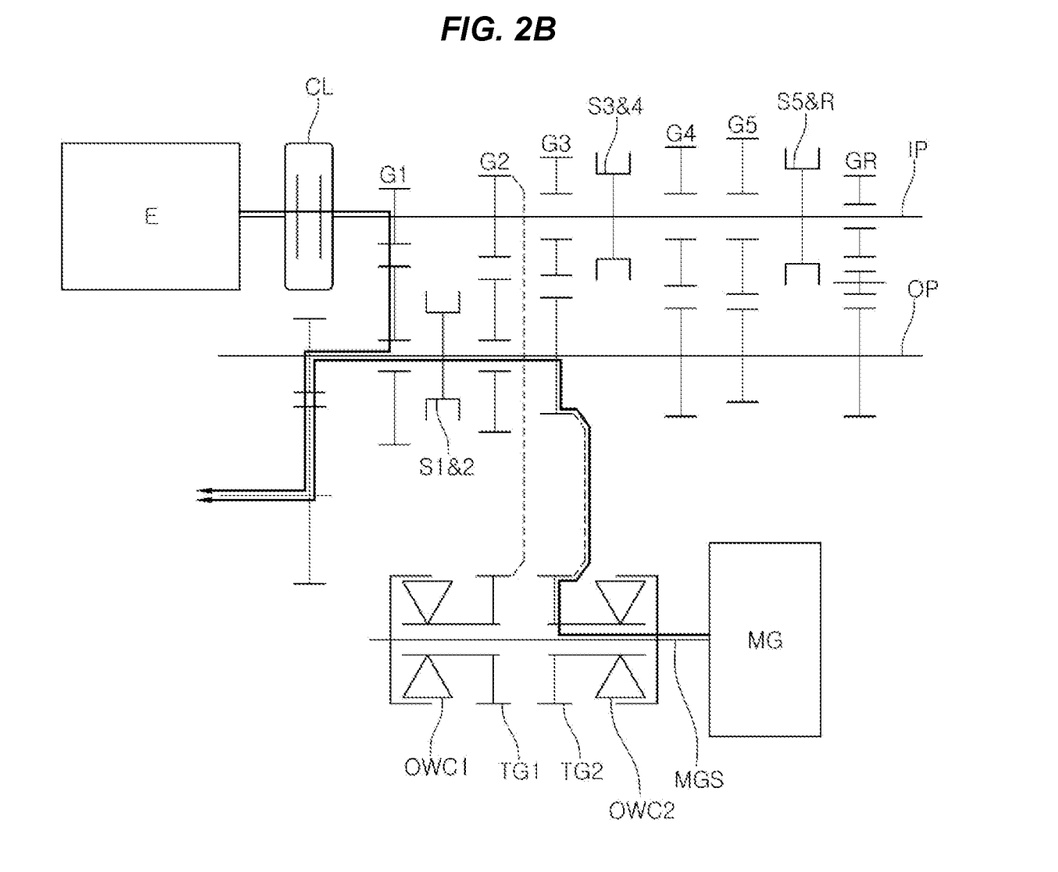

Next, when it is required to shift from the first gear stage to the second gear stage, as in FIG. 2B, the motor MG is rotated in the same direction as the rotational direction of the engine (clockwise) while the vehicle is driven at the first gear stage, so that the torque from the motor MG is transmitted to the second power transmission gear TG2 by the second one-way clutch OWC2 and provided to the output shaft OP. Obviously, the torque from the motor MG is not provided to the first power transmission gear TG1 through the first one-way clutch OWC1, so it is not provided to the input shaft IP.

The clutch CL is disengaged and then the second gear pair G2 is selected in the present state, and in the present process, the torque from the motor MG keeps being transmitted to the output shaft OP, so feeling of disconnection during shifting due to disconnection of torque can be removed.

Figure 2C:
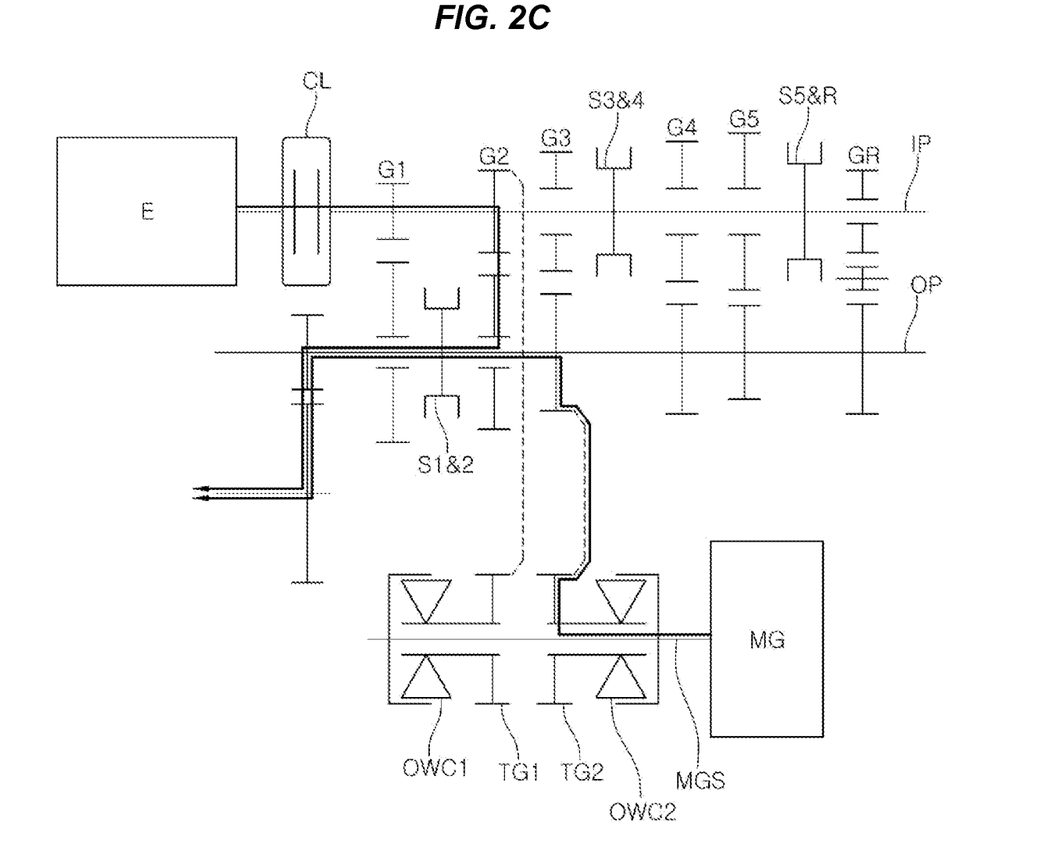
Figure 2D:
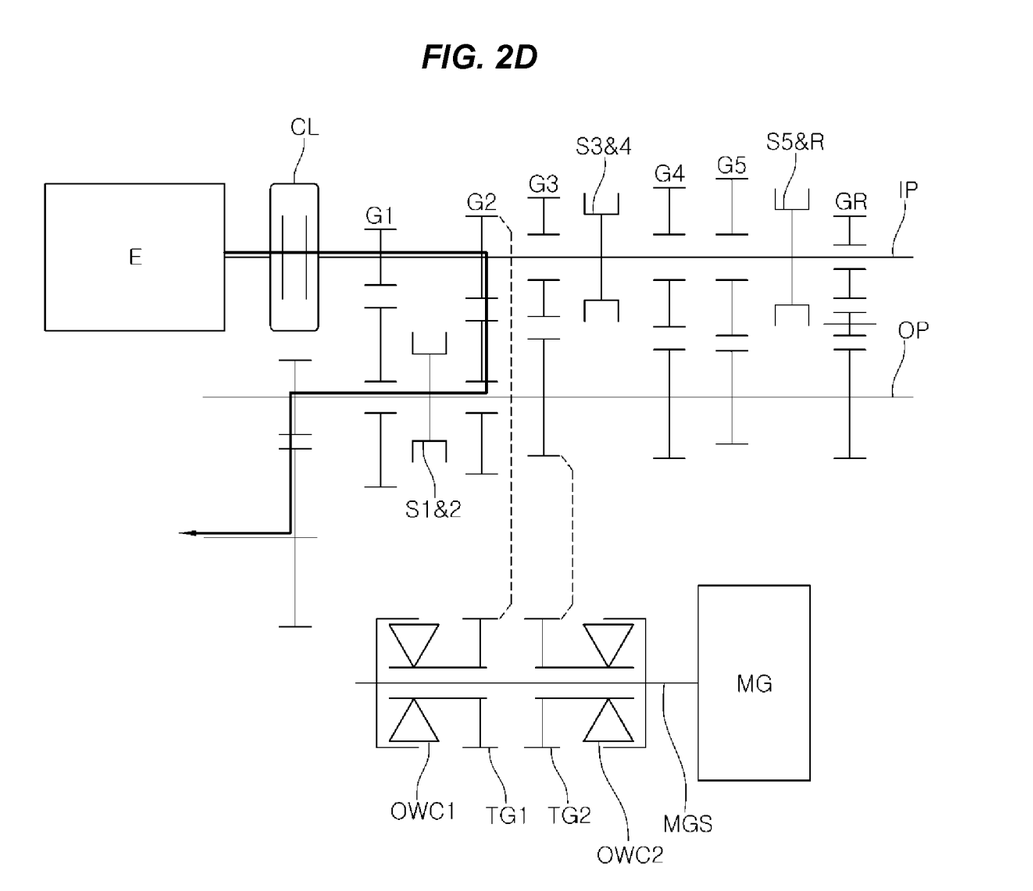

Next, as in FIG. 2C, the clutch CL is engaged, whereby the power from the engine E and the torque from the motor MG are provided to the output shaft OP through the second gear pair G2, and then shifting into the second gear stage can be finished by stopping rotation of the motor MG, as in FIG. 2D.

Figure 4:
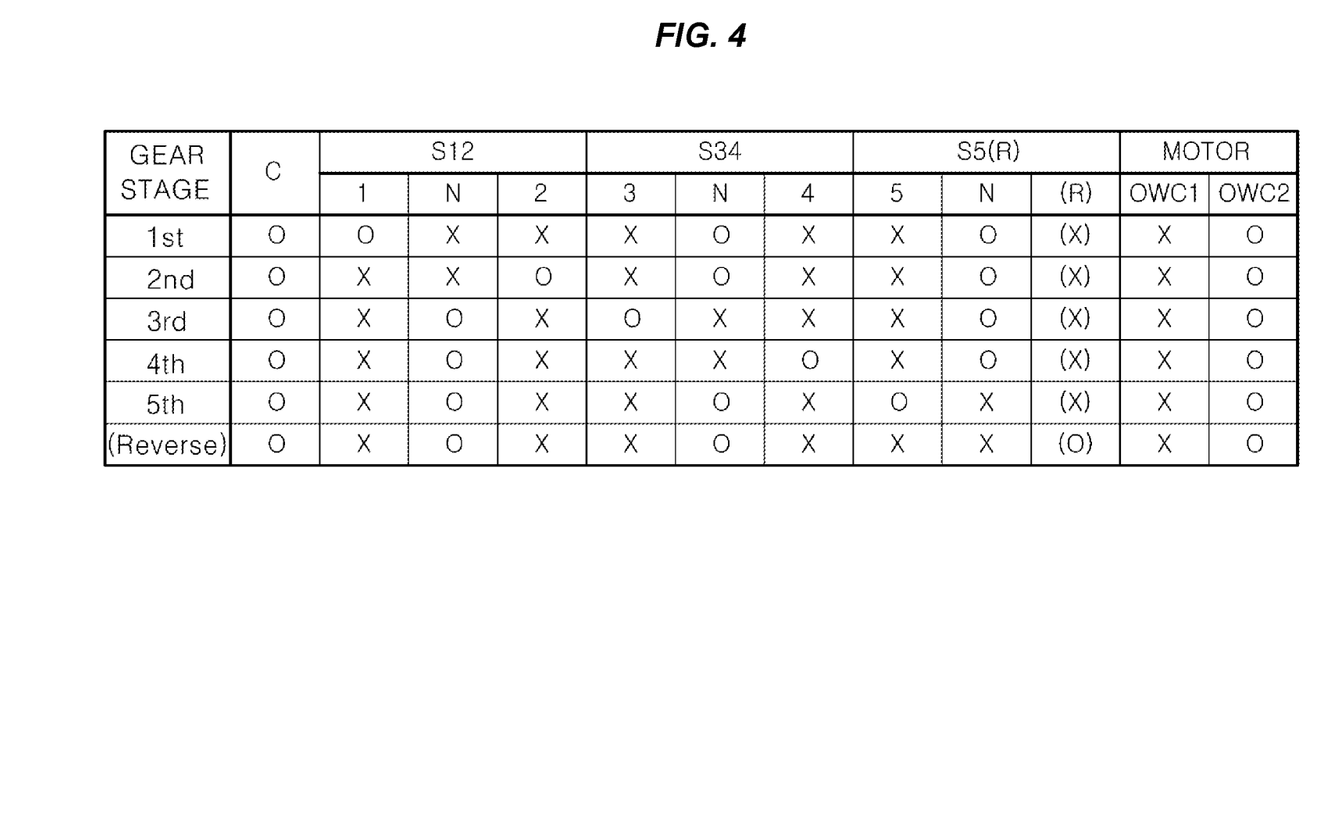
FIG. 4 is a diagram showing the operation states of a coupling member and first and second one-way clutches at each gear in FIG. 1.

Since the torque from the motor MG is directly supplied to the output shaft OP, torque assist can be achieved in the processes of shifting into all gear stages, as shown in the table of FIG. 4 and feeling of disconnection during shifting at all the gear stages can be effectively removed.

Figure 3:
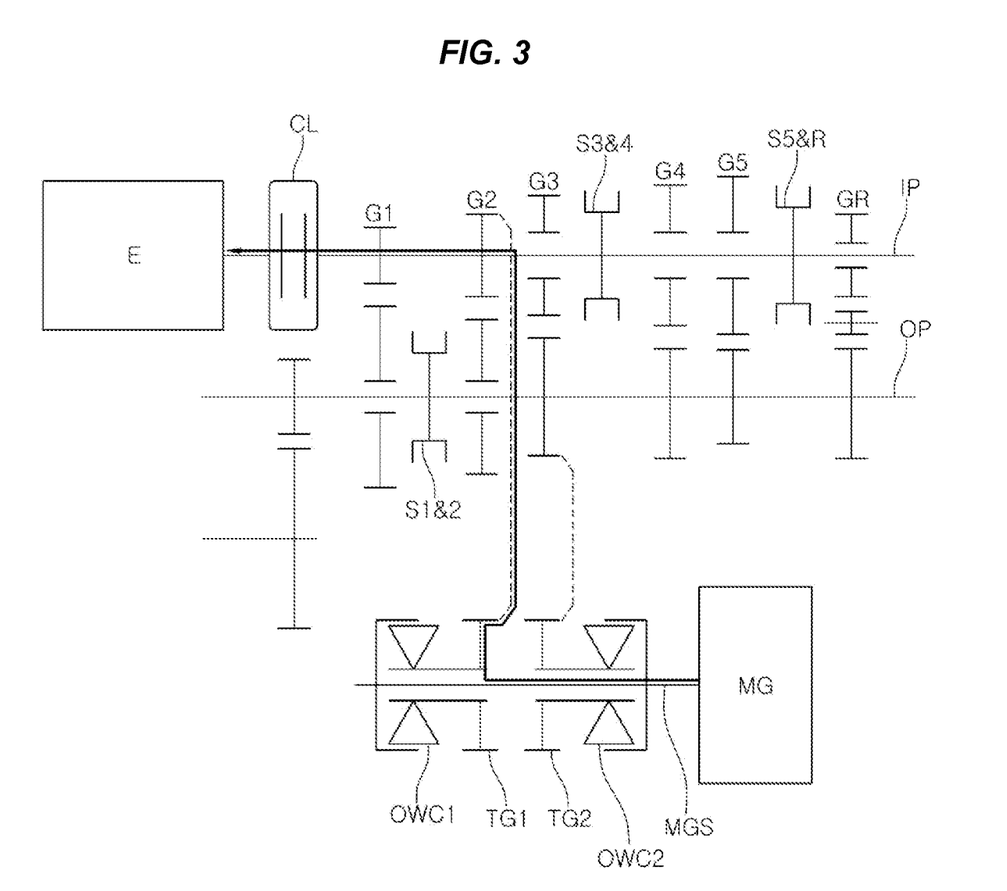
FIG. 3 is a diagram showing a power transmission path when an engine is started using the motor in FIG. 1.

Meanwhile, FIG. 3 shows a power transmission path when engine E is started using the motor MG, in which when the motor MG is rotated counterclockwise, the torque from the motor MG is transmitted to the first power transmission gear TG1 and the second power transmission gear TG2 through the first one-way clutch OWC1 and rotates the input shaft IP, so that the engine E can be started.

To this end, the clutch CL should be engaged and all coupling members are at the neutral positions.

Figure 5:
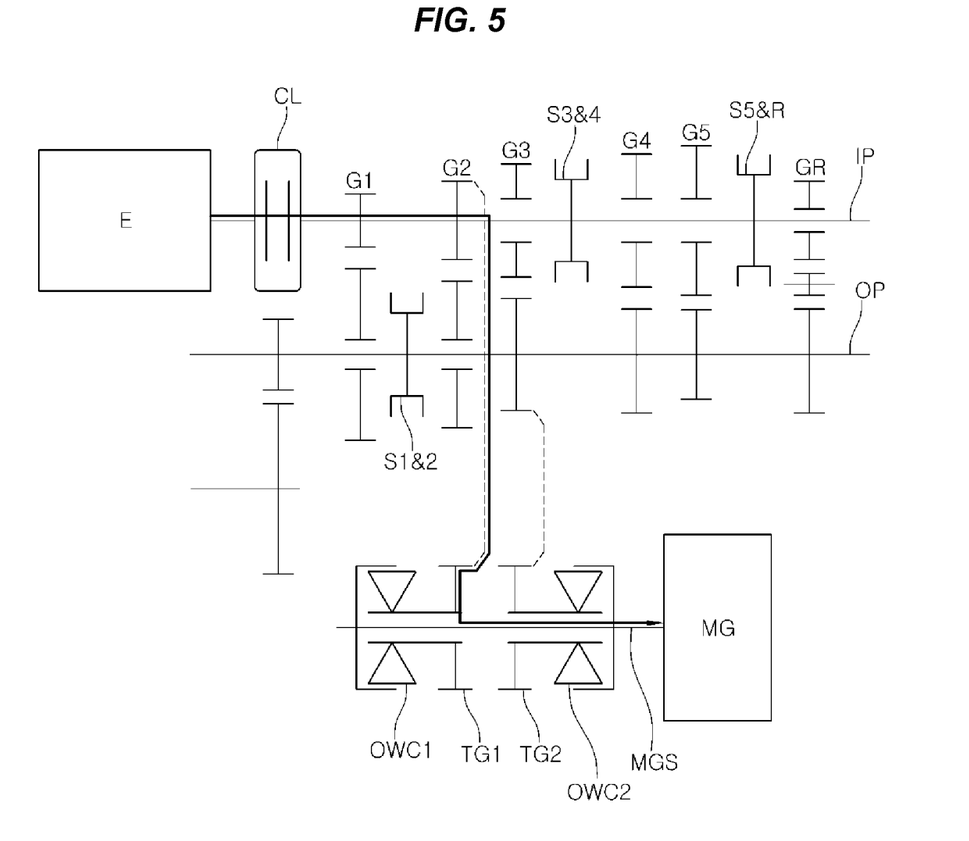
FIG. 5 is a diagram showing a power transmission path in idle charging in an exemplary embodiment of the present invention.

FIG. 5 shows a power transmission path in idle charging using the motor MG, in which when the torque from the engine E is transmitted to the first power transmission gear TG1 engaged with the second driving gear with the engine E idling, the motor shaft MGS is rotated by rotation restriction by the first one-way clutch OWC1, so a battery can be charged with electricity which is generated by the motor MG.

FIG. 6 shows a power transmission path in regenerative braking using a two-way clutch, in which torque reversely input to the output shaft OP through wheels is transmitted to the second power transmission gear TG2 engaged with the third driven gear while the vehicle is decelerated, the motor shaft MGS is rotated by rotation restriction by the second two-way clutch TWC2, so a battery can be charged with the electricity which is generated by the motor MG.

However, when a one-way clutch is used instead of the two-way clutch, and, for example, when the second gear pair G2 is selected, the torque reversely input to the output shaft OP through wheels is transmitted to the first power transmission gear TG1 through the second gear pair G2 and the motor shaft MGS can be rotated by rotation restriction by the first one-way clutch OWC1, so a battery can be charged.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission comprising:
an input shaft selectively provided with torque from an engine through a clutch;
an output shaft disposed in parallel with the input shaft;
a shifting device including a plurality of gear pairs, which have different gear ratios and are engaged with each other on the input shaft and the output shaft, and selecting at least a gear pair out of the plurality of gear pairs, by using a coupling member; wherein the at least a gear pair corresponds to a speed of a vehicle;
a motor shaft connected to a motor and provided with torque from the motor; and
clutch devices disposed between the motor shaft and the input shaft to transmit torque in a first direction thereof and between the motor shaft and the output shaft to transmit torque in a second direction thereof,
wherein the clutch devices include:
a first one-way clutch mounted on a power transmission path between the motor shaft and the input shaft; and
a second one-way clutch mounted on a lower transmission path between the motor shaft and the output shaft,
wherein a first power transmission gear is disposed on the motor shaft and connected to the first one-way clutch on the motor shaft, the first power transmission gear engaged with a first year pair of the gear pairs of the shifting device,
wherein a second power transmission gear is disposed on the motor shaft and connected to the second one-way clutch on the motor shaft, the second power transmission gear engaged with a second gear pair of the gear pairs except for the first gear pair engaged with the first power transmission gear,
wherein the first gear pair includes a first gear continuously rotating with the input shaft and the first power transmission gear is engaged with the first gear continuously rotating with the input shaft, and
wherein the second gear pair includes a second gear continuously rotating with the output shaft and the second power transmission gear is engaged with the second near continuously rotating with the output shaft.

2. The automated manual transmission of claim 1, wherein the clutch devices include:
the first one-way clutch mounted on the motor shaft; and
the second one-way clutch mounted on the motor shaft.

3. The automated manual transmission of claim 1,
wherein the first gear pair includes a third gear rotatably mounted on the output shaft and the first gear continuously rotating with the input shaft is engaged with the third gear rotatably mounted on the output shaft; and
wherein the second gear pair includes a fourth gear rotatably mounted on the input shaft and the second gear continuously rotating with the output shaft is engaged with the fourth gear rotatably mounted on the input shaft.

4. The automated manual transmission of claim 1,
wherein the first one-way clutch is disposed between the motor shaft and the first power transmission gear, and the second one-way clutch is disposed between the motor shaft and the second power transmission gear.

* * * * *